B. R. BENJAMIN & W. WEBBER.
MOWING MACHINE.
APPLICATION FILED NOV. 10, 1910.
995,398.
Patented June 13, 1911.
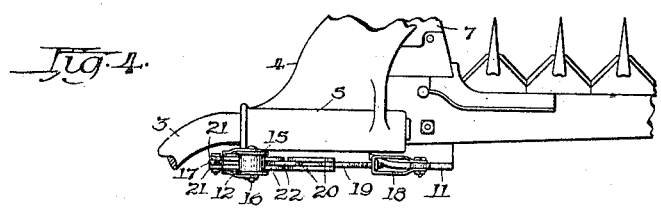
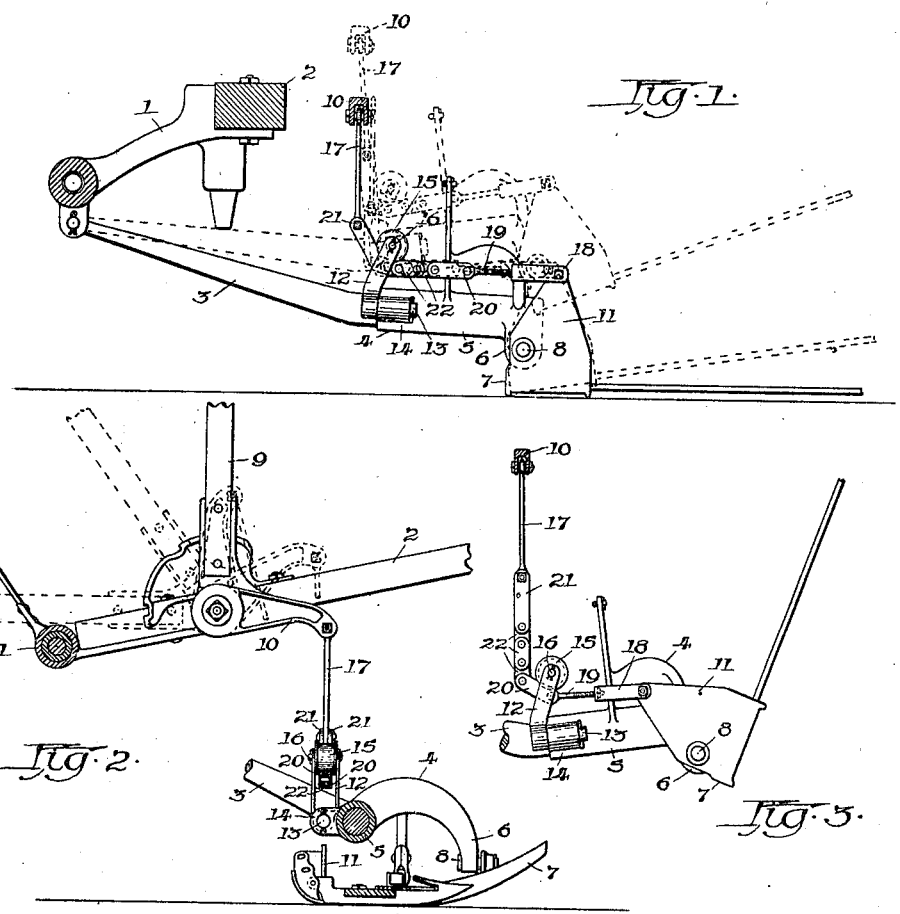

UNITED STATES PATENT OFFICE.

BERT R. BENJAMIN, OF OAK PARK, AND WILLIAM WEBBER, OF BERWYN, ILLINOIS.

MOWING-MACHINE.

995,398. Specification of Letters Patent. Patented June 13, 1911.

Application filed November 10, 1910. Serial No. 591,549.

*To all whom it may concern:*

Be it known that we, BERT R. BENJAMIN and WILLIAM WEBBER, citizens of the United States, residing at Oak Park and Berwyn, respectively, in the county of Cook and State of Illinois, have invented certain new and useful Improvements in Mowing-Machines, of which the following is a specification.

Our invention relates to mowing machines, and in particular to means for raising and lowering the cutting apparatus thereof toward or from a vertical position relative to the surface of the ground; the object of our invention being to provide a mechanism having a variable leverage to meet the requirements of easy manipulation and efficiency of operation. We attain these objects by means of the mechanism illustrated by the accompanying drawing, in which—

Figure 1 represents a rear side elevation of part of the wheel frame structure of a mowing machine having the cutting apparatus pivotally connected therewith and embodying our invention; Fig. 2 represents an end elevation of the cutting apparatus, partly in section, and a side view of a part of the frame structure of the machine designed to illustrate the manner of mounting the lifting lever and its connections with the cutting apparatus; Fig. 3 is a detached detail illustrating the connection between the lifting lever and the cutting apparatus; and Fig. 4 is a top plan view of a portion of Fig. 1.

The same reference characters designate like parts throughout the several views.

1 represents a member of the wheel frame, having a tongue 2 secured thereto, 3 a coupling bar having its stubbleward end pivotally connected with the mower frame in a manner permitting its opposite end to be raised or lowered, 4 a yoke having a sleeve portion 5 loosely mounted on the grassward end of the coupling bar and provided with depending ears 6, through which it is connected with an inner shoe 7 forming part of the cutting apparatus by means of hinge pins 8.

9 represents a lifting lever pivotally mounted upon the frame of the machine and having a forwardly projecting arm 10 at its lower end, 11 a vertically arranged arm forming part of the rear end of shoe 7, 12 a fulcrum arm having a stem 13 at its lower end that is journaled in an ear 14 upon the stubbleward end of the sleeve 5, the axis of the stem being substantially parallel with the axis of the sleeve, and 15 represents a roller journaled at the upper end of the arm upon a pin 16 arranged at right angles to the axis of the stem.

17 represents a link having its upper end pivotally connected with the forward end of arm 10, 18 a clevis member having its grassward end pivotally connected with the upper end of arm 11, and 19 a link adjustable in length and having one end connected with said clevis member and its opposite end pivotally connected with links 20.

21 represents links pivotally connected with the lower end of link 17 and connected with links 20 by means of a series of links 22 having a less length than links 20 and 21.

In the operation of machines of the character described it is desirable, when the hand lever is manipulated for the purpose of raising the cutting apparatus from the ground that the force of the initial movement thereof be transmitted to the cutting apparatus in a manner to cause the grassward end of the cutting bar to leave the surface of the ground in advance of the opposite end thereof by turning about the pivotal connection of the shoe with the coupling bar until a predetermined angle of elevation is reached, and then to cause the coupling bar to swing upward about its pivotal connection with the frame in a manner to raise the bar and shoe bodily without materially changing the angular relation of the cutter bar and coupling bar, the upward movement of the latter being usually limited by contact with a fixed part of the frame of the machine, as shown in Fig. 1, and when the coupling bar has reached the limit of its upward movement a further movement of the hand lever operates to lift the cutter bar to a substantially vertical position, and it is desirable to transmit the force of the lever during the range of its movement in a manner to apply it more directly to the purpose required. The desired results are attained in a very efficient manner by means of our improved mechanism connecting the arm of the hand lever with the arm upon the inner shoe of the cutting apparatus, including links of variable length and controlled by the swinging fulcrum in a manner whereby a variable leverage is obtained at the time and in the direction and for the purpose required. As seen in Fig. 1, when the cutter bar is resting upon the ground the links 21 are in contact with the fulcrum and are disposed at an angle with the link 17 and when power is applied to the hand lever to raise the finger bar, the links 21 operate as levers in connection with the swinging fulcrum in a manner to increase their effective leverage for the purpose of transmitting more of the initial lifting force of the hand lever directly in a longitudinal direction upon the links 22 in a direction to lift the grassward end of the cutter bar from the ground than to raise the coupling frame, and, as seen in Fig. 3, the leverage is again increased by means of the long links 20 being operative as lever members contacting with the fulcrum and having the force applied in a more direct manner to the part 11 when it is desired to raise the cutter bar to a vertical position.

What we claim as our invention, and desire to secure by Letters Patent, is:

1. A mowing machine including, in combination, a wheel frame, a coupling bar pivotally connected to said wheel frame and adapted to be raised or lowered at its grassward end, a cutter bar connected at its inner end by means of a hinge joint with said coupling bar, a hand lever mounted upon said frame, a swinging fulcrum carried by said coupling bar, a vertically arranged arm secured to the inner end of said cutter bar, a flexible connection between the hand lever and said arm and engaging with said fulcrum, said connection including links of variable length whereby a variable leverage is obtained as they swing about said fulcrum.

2. A mowing machine including, in combination, a wheel frame, a coupling bar pivotally connected to said wheel frame and adapted to be raised or lowered at its grassward end to a limited height, a cutter bar having its inner end connected by means of a hinge joint with said coupling bar, a hand lever mounted upon said frame, a swinging fulcrum carried by said coupling bar, a vertically arranged arm secured to the inner end of said cutter bar, a flexible connection between the hand lever and said arm and engaging with said fulcrum, said connection including links having variable lengths, a relatively long link coöperating with said fulcrum at an angle from the vertical whereby the power of the hand lever in its initial movement is transmitted in a direction to cause the grassward end of said cutter bar to rise in advance of said coupling bar.

3. A mowing machine including, in combination, a wheel frame, a coupling bar pivotally connected to said wheel frame and adapted to be raised or lowered at its grassward end to a limited height, a cutter bar having its inner end connected by means of a hinge joint with said coupling bar, a hand lever mounted upon said frame, a swinging fulcrum carried by said coupling bar, a vertically arranged arm secured to the inner end of said cutter bar, a flexible connection between the hand lever and said arm and engaging with said fulcrum, said connection including links having variable lengths, and a relatively long link coöperating with said fulcrum at an angle from the vertical whereby the power of the hand lever as it nears the end of its operative movement is transmitted in a direction to increase the leverage and to swing the cutter bar to a vertical position when said coupling bar has reached the limit of its upward swing.

BERT R. BENJAMIN.
WILLIAM WEBBER.

Witnesses:
RAY D. LEE,
A. M. CHRISTIAN.

---

Copies of this patent may be obtained for five cents each, by addressing the "Commissioner of Patents, Washington, D. C."